United States Patent
Lu et al.

(10) Patent No.: US 7,139,267 B2
(45) Date of Patent: Nov. 21, 2006

(54) SYSTEM AND METHOD OF STACKING NETWORK SWITCHES

(75) Inventors: Kuo-Cheng Lu, Hsin-Chu (TW); Hung-Kuang Chen, Hsin-Chu Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 1010 days.

(21) Appl. No.: 10/087,761

(22) Filed: Mar. 5, 2002

(65) Prior Publication Data

US 2003/0169734 A1    Sep. 11, 2003

(51) Int. Cl.
*H04L 12/50* (2006.01)

(52) U.S. Cl. ............... 370/386; 370/389; 370/400

(58) Field of Classification Search ........... 370/386, 370/382, 379, 428
See application file for complete search history.

(56) References Cited

U.S. PATENT DOCUMENTS

| | | | |
|---|---|---|---|
| 5,732,041 A | | 3/1998 | Joffe |
| 5,909,686 A | * | 6/1999 | Muller et al. ............ 707/104.1 |
| 6,058,116 A | | 5/2000 | Hiscock et al. |
| 6,813,268 B1 | * | 11/2004 | Kalkunte et al. ............ 370/392 |
| 2002/0124107 A1 | * | 9/2002 | Goodwin ............... 709/242 |
| 2005/0030948 A1 | * | 2/2005 | Wyatt ................... 370/392 |
| 2005/0063313 A1 | * | 3/2005 | Nanavati et al. ............ 370/252 |

* cited by examiner

*Primary Examiner*—Chau Nguyen
*Assistant Examiner*—Christopher Grey
(74) *Attorney, Agent, or Firm*—Finnegan, Henderson, Farabow, Garrett & Dunner, L.L.P.

(57) ABSTRACT

A network switch system that includes a plurality of first-level switches operating in a slave mode, the first-level switches providing a plurality of local ports for receiving and sending network packets, and a plurality of second-level switches operating in one of brain mode or master mode, wherein, the first-level switches includes a plurality of upward ports connecting to the second-level switches, each of the first-level switches and the second-level switches having a forwarding database, wherein the first-level switches sends the refresh packets to the second-level switches for synchronizing the forwarding databases of the second-level switches, wherein the second-level switches providing packet communications among the first-level switches, and wherein a second-level switch operating in the brain mode providing refresh packets to the first-level switches for synchronizing the forwarding databases of the first-level switches.

36 Claims, 9 Drawing Sheets

Table entry format

SYSTEM AND METHOD OF STACKING NETWORK SWITCHES

DESCRIPTION OF THE INVENTION

1. Field of the Invention

This invention pertains in general to systems and methods for stacking network switches, and more particularly, to systems and methods for stacking network switches with forwarding database synchronization.

2. Background of the Invention

A network system generally provides the exchange of information among multiple ends. Taking a computer network system as an example, the system provides the exchange of information among multiple nodes or segments. Each node or segment may contain one or more terminals, which may be a server, personal computer ("PC"), input device, or output device, such as a printer or plotter. In general, network switches manage and regulate traffic among the nodes or segments of a network system to enable efficient exchange of data and reduce network traffic congestion by directing packets to their designated destinations.

In an Ethernet network system, an Ethernet switch integrated circuit ("IC") is an Application Specific Integrated Circuit ("ASIC") that provides the capability to manage and regulate network traffic. The need for systems having different numbers of ports has driven the development of various types of specifications for Ethernet switch ICs. For example, systems designed for high-speed Ethernet operations frequently integrate a significant number of ports in a single chip to promote efficiency and traffic-handling capabilities. This type of chips typically require significant memory bandwidth and, as a result, substantial development time and considerable production cost.

Under the general operating procedures of Ethernet switching, an Ethernet packet records the destination and source addresses in the first 12 bytes of the packet data. When an Ethernet switch receives a packet, the switch retrieves the destination address and looks up the output port for the destination in a forwarding database that provides a corresponding port to each address. The switch then sends the packet to the identified destination port. A network switching system may create the forwarding database by registering the source address and port information of each incoming packet to the forwarding database. IEEE 802.1D, a standard on Media Access Control ("MAC") bridges, provides the operation procedures for creating forwarding databases and transmitting and receiving of network packets. A "learning process" for a network switch systems means the aforementioned operation of registering source address and port information to a forwarding database. The process enables an Ethernet switch to send incoming packets to their destination ports based on the registered information in the forwarding database.

Each Ethernet switch has only a limited number of ports and manages network traffic among a limited number of nodes or segments. For an Ethernet switch system to provide more ports, the system frequently has to combine, or "stack," two or more Ethernet switches and provides interconnections between the Ethernet switches to enable coordinated operation of the combined system. stacking can categorized into one of four types: shared bus, switching fabric, ring-bus, and interleaved interconnection structures.

FIG. 1 illustrates a functional block diagram of a system with a known shared bus structure. Referring to FIG. 1, each of ESW1, ESW2, ESW3, and ESW4 represents an Ethernet switch, and each contains a packet memory. When an Ethernet switch receives an input packet, the Ethernet switch first makes a forwarding decision to determine the delivery path of the packet. The Ethernet switch stores the input packet temporarily into the packet memory of the switch. If the destination port of the input packet is within the same local area managed by the Ethernet switch, the switch sends the input packet directly through one of the output ports of the switch.

Conversely, for an input packet having a destination port outside the local area of the Ethernet switch, the Ethernet switch first sends a request through the shared bus to request that the destination Ethernet switch have a packet buffer available. The Ethernet switch then sends the packet through the shared bus. After the destination Ethernet switch receives the full packet, the Ethernet switch releases the buffer that stores the packet. The destination Ethernet switch then stores the input packet in its packet memory and sends the packet through one of its output ports.

The second known stacking approach, the switching fabric structure, may be further divided into a shared-memory switching fabric and crossbar switching fabric. A network switch with a shared-memory switching fabric structure allows all network ports to write arriving data, such as packets from input ports, into a shared memory. An output port then reads out the packet after the switch system makes a forwarding decision. However, the write-read operations require repetitive access to a significant amount of centralized shared-memories. The requirement limits the expandability of the system because the shared memory block of the system has a limited bandwidth and storage space. As an illustrative example, the shared-memory switching fabric of an Ethernet port of 16 Gigabit requires a bandwidth of 32 Gigabit to enable the write-read operations. The requirement on large bandwidth and memory size poses a significant challenge for modern memory design of Ethernet switches with expanded bandwidths.

FIG. 2 illustrates a functional block diagram of a network switch system with a crossbar switching fabric structure 10. Comparing with the shared-memory switching fabric structure, a crossbar switching fabric structure seeks to increase the capability of a switching fabric. The system in FIG. 2 provides an input queue (not shown) to store packets at the input end of each port. A crossbar scheduler 12 then provides an output port upon request. Packets are sent through the switching fabric 10 that switches, or channels, the packets to an output port according to instructions from the scheduler 12. Because this approach does not rely on a shared memory block to provide a buffer zone for packet exchange, it eliminates the reliance on memory bandwidth of the shared-memory switching fabric structure and therefore provides improved expandability. This type of switching fabric structure, however, requires a sophisticated scheduler to efficiently cooperate with the switch fabric and provide full throughput by effective delay control of packet transmissions. The requirement on scheduler capability poses substantial development and production costs.

As FIG. 2 illustrates, each of the Ethernet switches ESW5, ESW6, ESW7, and ESW8 connects to the scheduler 12. When an Ethernet switch, for example, ESW5, needs to send a packet to another Ethernet switch, for example, ESW8, ESW5 sends a request to the scheduler 12 in order to have a point-to-point connection arranged by the scheduler 12. ESW5 then sends the packet as the switching fabric 10 provides a channel between the sender Ethernet switch ESW5 and the receiving Ethernet switch ESW8.

FIG. 3 illustrates a functional block diagram of a network switch system with a ring-bus structure. Four Ethernet switches, ESW9, ESW10, ESW11, and ESW12 connect sequentially and circularly for forming a ring structure. This system, due to its nature, often transmits a packet through one or more intermediate Ethernet switches in order to send a packet. For example, in order to send a packet from ESW9 to ESW12, the switch structure first sends the packet to ESW10, then ESW11, and finally ESW12. The process consumes additional processing resources of the switches and limits the throughput of the switching system. Allayer Communications and PMC-Sierra, Inc., both of the Unites States, provide Ethernet switch products that employ similar ring-stacking structures.

FIG. 4 illustrates a functional block diagram of a network switch system with an interleaved interconnection structure. Alexander illustrates, in U.S. Pat. No. 5,732,041, memory interface systems for providing and arbitrating access to a shared memory by multiple devices. As FIG. 4 illustrates, four Ethernet switches, ESW13, ESW14, ESW15, and ESW16, cross-connect with each other. Each of the four Ethernet switches has a packet memory for storing packets that are awaiting transmission.

The switching architectures described above all require special stacking buses or wirings to cross-connect the Ethernet switches, and have several major drawbacks. First, there is not a standard interface or protocol for the stacking buses among switches and therefore this structure requires a customized design according to the types of Ethernet switches. Second, the stacking buses cannot be used as ordinary network ports and thus would be useless as a stand-alone. Third, the stacking buses have limited bandwidth and this inherent limitation restricts the expandability of the network system. Fourth, the requirement of a customized design of the stacking buses increases the system cost.

Other than employing switching various fabrics, Ethernet switches may be connected through Ethernet ports in a two-level structure to form a switch system that provides more ports. FIG. 5 illustrates a functional block diagram of a two-level structure where four lower-level Ethernet switches, ESW17, ESW18, ESW19, and ESW20, are connected to an upper-level Ethernet switch ESW21. Whenever any of the lower level Ethernet switches ESW17, ESW18, ESW19, or ESW20 needs to send a packet, the lower level Ethernet switch first sends the packet to the upper level Ethernet switch ESW21, and the packet is then sent to the intended destination through ESW21. The two-level structure system requires no specific modification or re-design of Ethernet switches. As a result, Ethernet from different manufacturers or of different designs can be combined to provide a switch system with an increased number of ports.

The two-level structure system, however, is not a non-blocking structure because all packets from the ports of the Ethernet switches ESW17, ESW18, ESW19, and ESW20, pass through a single Ethernet switch ESW21. Without a non-blocking design, packet loss may occur when each port sends packets at full throughput to different output ports and the full traffic congests ESW21. The problem of packet loss comes from the limited bandwidth of the connections between the upper-level Ethernet switch ESW21 and the lower-level Ethernet switches ESW17, ESW18, ESW19, and ESW20. Nevertheless, because of its simplicity, this structure is frequently employed in systems that emphasize less on non-blocking features or traffic handling capacities.

SwitchCore AB of Sweden ("SwitchCore") has provided a different structure in its products. FIG. 6 illustrates a functional block diagram of a SwitchCore switch system, which follows the traditional connection structure that aims to provide load balancing and redundant capabilities in network planning, as described by Hiscock et al. in U.S. Pat. No. 6,058,116, titled "Interconnected trunk cluster arrangement." Referring to FIG. 6, each of lower level Ethernet Switches ESW22, ESW23, ESW24, and ESW25 has the same number of cascading and user ports, and the switch system is capable of achieving non-blocking. However, the switch system needs to synchronize the forwarding databases of the system to avoid unnecessary broadcasts of packets and potential sequencing disorder of packets. Because the SwitchCore system lacks a centralized forwarding database, the system instead generates several forwarding databases. The forwarding databases of upper-level Ethernet switches do not possess the same address-port information as those of the lower-level Ethernet switches. This non-uniformity of the forwarding databases may cause system operation instabilities. As an example, a first Ethernet switch might not have the source address and port information that has been registered to a second Ethernet switch. As a result, the first Ethernet switch has to broadcast a packet when the first Ethernet switch does not contain any forwarding port information for a particular packet. The broadcasting operation increases the number of broadcasting packets and thus additional network traffic. Transmission of the broadcasting packets therefore increases the load on the system and reduces the system throughput.

Referring again to FIG. 6, the SwitchCore approach enables lower-level Ethernet switches ESW22, ESW23, ESW24, and ESW25 to learn the source addresses and ports of only packets from the lower-level ports, but not packets from the cascaded ports connected to the upper-level Ethernet switches ESW26 and ESW27. Each of the lower-level Ethernet switches, therefore, only has the port information of the users of that switch, but not the port information of the users of other Ethernet switches. For example, the switch ESW22 possesses the port information of its own users, but not the port information of the users of the switch ESW24. When the lower-level Ethernet switch ESW22 receives a packet of unregistered destination address, the switch ESW22 sends the packet to an upper-level Ethernet switch, for example, ESW26, through the cascaded port between the two switches. The upper-level switch ESW26 then determines the destination port information and sends the packet to the destination lower-level switch, for example, ESW24. The SwitchCore approach, therefore, allows and necessarily requires the upper-level Ethernet switches to have uniform forwarding databases by notifying a system Central Processing Unit ("CPU") whenever the switch learns about new source address and port information, so that the system may register the information to the forwarding database of each of the upper-level Ethernet switches.

The SwitchCore approach therefore allows the use the same type of Ethernet switches to construct an expanded Ethernet switch system, and provides that the lower-level Ethernet switches only need to register the source address and port information from the local ports. In addition, only the upper-level Ethernet switches need to maintain comprehensive forwarding databases with uniform information by the operation of the system CPU. As a result, however, the SwitchCore approach requires the system CPU to constantly process source address and source port information and update all the forwarding databases of the upper-level switches, which represent a significant load on the CPU. Furthermore, when an upper-level Ethernet switch does not have the destination port information for a packet of an unregistered destination address, the upper-level switch must send the packet back to all of the lower-level Ethernet switches, including the source lower-level Ethernet switch that delivers the packet. The returning operation occupies additional bandwidth and limits the availability of the system bandwidth to handle other network packets.

Without limiting the scope of the present invention, the foregoing paragraphs illustrate the background of the present invention with an exemplary Ethernet network system. The systems and methods of the present invention are also applicable to different types of network systems.

SUMMARY OF THE INVENTION

Accordingly, the present invention is directed to systems and methods for stacking network switches that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the systems and methods particularly pointed out in the written description and claims hereof, as well as the appended drawings.

To achieve these and other advantages, and in accordance with the purpose of the invention as embodied and broadly described, the present invention provides a network switch system that includes a plurality of network switches for providing an exchange of network packets, each of the network switches including a forwarding database, wherein the network switch system is capable of providing at least one refresh packet, upon receiving the network packets, to synchronize the forwarding databases of the plurality of network switches, and wherein each of the plurality of network switches registers the at least one refresh packet to the forwarding database of the network switch upon receiving the refresh packets.

In one aspect, the forwarding databases include at least one refresh timer in an address entry for recording the validity of a corresponding address entry in the forwarding databases of neighboring switches.

In another aspect, the forwarding databases include an address entry having an age timer for the address entry that records the validity of the address entry, an address for the address entry, and associated port information for the address.

In yet another aspect, the plurality of network switches includes a first switch and a second switch, each having a forwarding database, the first switch sending a refresh packet to a second switch when the first switch receives a network packet and the network packet containing address information that the forwarding database of the first switch has no corresponding address entry; or the network packet containing address information that a corresponding address entry in the forwarding database of the second network switch has expired.

In still another aspect, the plurality of network switches further includes a plurality of first-level switches having a plurality of upward ports operating in a slave mode, a plurality of second-level switches including a channeling switch, wherein each of the first-level switches is configured to connect to each of the second-level switches, wherein at least one second-level switch operates in a brain mode and at least one second-level switch operates in a master mode, wherein the first-level switches providing a plurality of local ports for receiving and sending network packets, the upward ports of the first-level switches connecting to the second-level switches, the first-level switches sending the refresh packets to the second-level switches for synchronizing the forwarding databases of the second-level switches, and wherein the second-level switches providing packet communications among the first-level switches, the second-level switch operating in the brain mode providing refresh packets to the first-level switches for synchronizing the forwarding databases of the first-level switches.

The present invention also provides a network switch system that includes a plurality of first-level switches operating in a slave mode, the first-level switches providing a plurality of local ports for receiving and sending network packets, and a plurality of second-level switches operating in one of brain mode or master mode, wherein, the first-level switches includes a plurality of upward ports connecting to the second-level switches, each of the first-level switches and the second-level switches having a forwarding database, wherein the first-level switches sends the refresh packets to the second-level switches for synchronizing the forwarding databases of the second-level switches, wherein the second-level switches providing packet communications among the first-level switches, and wherein a second-level switch operating in the brain mode providing refresh packets to the first-level switches for synchronizing the forwarding databases of the first-level switches.

In one aspect, one of the first-level switches sends a refresh packet to the second-level switches connected with the first-level switch when the first-level switch receives a network packet, and the packet contains address information that the forwarding database of the first-level switch has no corresponding address entry, or the network packet contains address information that a corresponding address entry in the forwarding databases of one of the second-level switches has expired.

In another aspect, the second-level switch operating in the brain mode sends a refresh packet to the first-level switches connected with the second-level switch if the second-level switch operating in the brain mode receives a network packet, and the network packet contains address information that the forwarding database of the second-level switch operating in the brain mode has no corresponding address entry, the network packet containing address information that corresponding address entries in the forwarding databases of the first-level switches have expired, or the second-level switch operating in the brain mode receives an incoming refresh packet from the first-level switches.

In yet another aspect, one of the second-level switches needs to send a refresh packet coming from a first-level initiating switch or containing the source address information of a network packet from a first-level source switch, the second-level switch sends the refresh packet to each of the first-level switches except the first-level initiating switch and the first-level source switch.

The present invention further provides a method for operating a network switch in a slave mode within a network switch system, the slave switch having a forwarding database that includes receiving a network packet, sending an outgoing refresh packet to neighboring switches when the network packet contains address information that the slave switch has no corresponding record in the forwarding database of the slave switch, or the network packet contains address information that corresponding address entries in the forwarding databases of the neighboring switches have expired, wherein the slave switch sends the outgoing refresh packet to synchronize the forwarding databases of the neighboring switches, registering the address information of the network packet to the forwarding database of the slave switch, and registering the address information of an incoming refresh packet to the forwarding database of the slave switch upon receiving the incoming refresh packet.

In one aspect, the method further includes looking up the destination port of the network packet in the forwarding database of the slave switch, sending the network packet to the destination port, and broadcasting the network packet when the forwarding database of the slave switch has no corresponding destination port information for the network packet.

In another aspect, the forwarding database of the slave switch includes a refresh timer in an address entry for recording the validity of a corresponding address entry in the forwarding databases of the neighboring switches.

In still another aspect, the forwarding database of the slave switch includes an address entry containing an age timer for the address entry that records the validity of the address entry, an address for the address entry, and associated port information for the address.

The present invention additional provides a method of operating a network switch in a brain mode within a network switch system, the brain switch having a forwarding database that includes receiving a network packet, sending an outgoing refresh packet to neighboring switches when the network packet contains address information that the forwarding database of the brain switch has no corresponding address entry, the network packet contains address information that corresponding address entries in the forwarding databases of the neighboring switches have expired, or the brain switch receives an incoming refresh packet from the neighboring switches, wherein the brain switch sends the outgoing refresh packet to synchronize the forwarding databases of the neighboring switches, and registering the address information of the network packet to the forwarding database of the brain switch.

The present invention also provides a method of operating a network switch in a master mode within a network switch system, the master switch having a forwarding database that includes receiving an incoming network packet, registering address information of an incoming refresh packet to the forwarding database of the master switch upon receiving the incoming refresh packet, looking up the destination port of the incoming network packet in the forwarding database of the master switch, sending the incoming network packet to the destination port, and broadcasting the incoming network packet when the forwarding database does not have corresponding destination port information.

In one aspect, a neighboring switch of the master switch sends the refresh packet to the master switch when the neighboring switch receives an original network packet, and the original network packet contains address information that the forwarding database of the neighboring switch has no corresponding address entry, or the original network packet contains address information that a corresponding address entry in the forwarding databases of the master switch has expired.

In another aspect, the forwarding database of the master switch includes an address entry containing an age timer for the address entry that records the validity of the address entry, an address for the address entry, and associated port information for the address.

The present invention further provides a method for stacking network switches that includes providing a plurality of network switches for providing an exchange of network packets, providing a forwarding database for each of the network switches, providing at least one refresh packet to synchronize the forwarding databases of the plurality of network switches upon receiving the network packets, and registering the refresh packet for each of the plurality of network switches to the forwarding databases.

In one aspect, the method further includes providing a first switch and a second switch, providing a forwarding database for the first switch and the second switch, and the first switch sending a refresh packet to a second switch when the first switch receives a network packet and the network packet containing address information that the forwarding database of the first switch has no corresponding address entry, or the network packet containing address information that a corresponding address entry in the forwarding database of the second network switch has expired.

In another aspect, the method also includes providing a plurality of first-level switches having a plurality of upward ports operating in a slave mode, providing a plurality of second-level switches including a channeling switch, operating at least one second-level switch operates in brain mode, operating least one second-level switch operates in a master mode, providing a plurality of local ports in the first-level switches for receiving and sending network packets, connecting the upward ports of the first-level switches to the second-level switches, sending the refresh packets to the second-level switches for synchronizing the forwarding databases of the second-level switches, and providing packet communications among the first-level switches, and providing refresh packets to the first-level switches for synchronizing the forwarding databases of the first-level switches.

In still another aspect, the method additionally includes sending the refresh packet to each of the second-level switches except the channeling switch when one of the first-level switches sends a network packet to one of the second first-level switches through the channeling switch and needs to send a refresh packet containing the source address information of the network packet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate the embodiments of the invention and, together with the description, serve to explain the objects, advantages, and principles of the invention.

In the drawings.

DESCRIPTION OF THE EMBODIMENTS

The present invention provides systems and methods for stacking network switches. The systems and methods synchronize forwarding databases of a network switch without requiring significant processing resources and provide the operational efficiency of a non-blocking system. The systems and methods may also employ multiple network switches of the same type to construct a network switch system with expanded number of ports.

In general, the systems and methods of the present invention operate in four different modes, normal, brain, master, and slave. A network switch is set to the normal mode of operation to enable a single network switch to operate independently. A plurality of network switches may also be combined and operate in different modes, including brain, master, and slave, for a stacked network switch system. The stacked configuration will provide more ports than a single network switch. In addition, the systems and methods for stacking network switches of the present invention are applicable to different types of network systems, including an Ethernet network system. In addition, the network switches may communicate with each other based on different types of network interfaces, such as MII, RMII and GMII interfaces in an Ethernet network environment.

Figure 1:
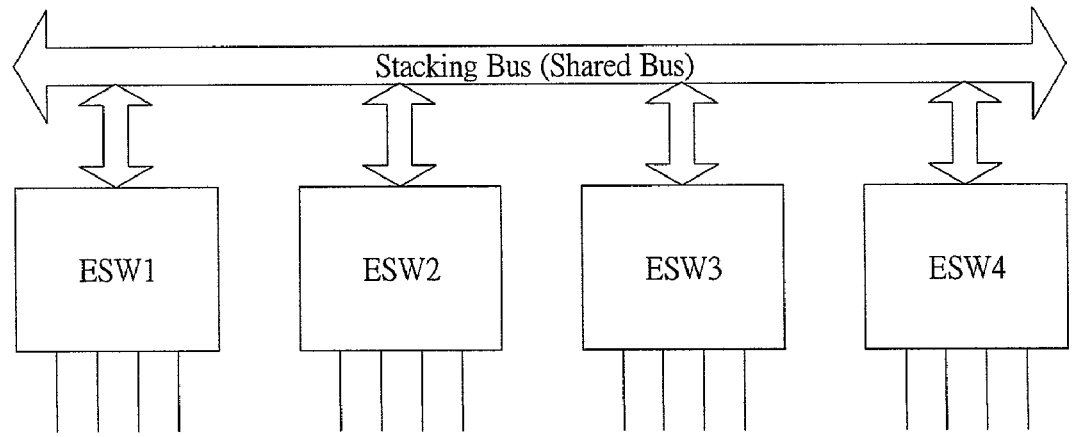
FIG. 1 is a functional block diagram of a network switch system with a known shared bus structure.
Figure 2:
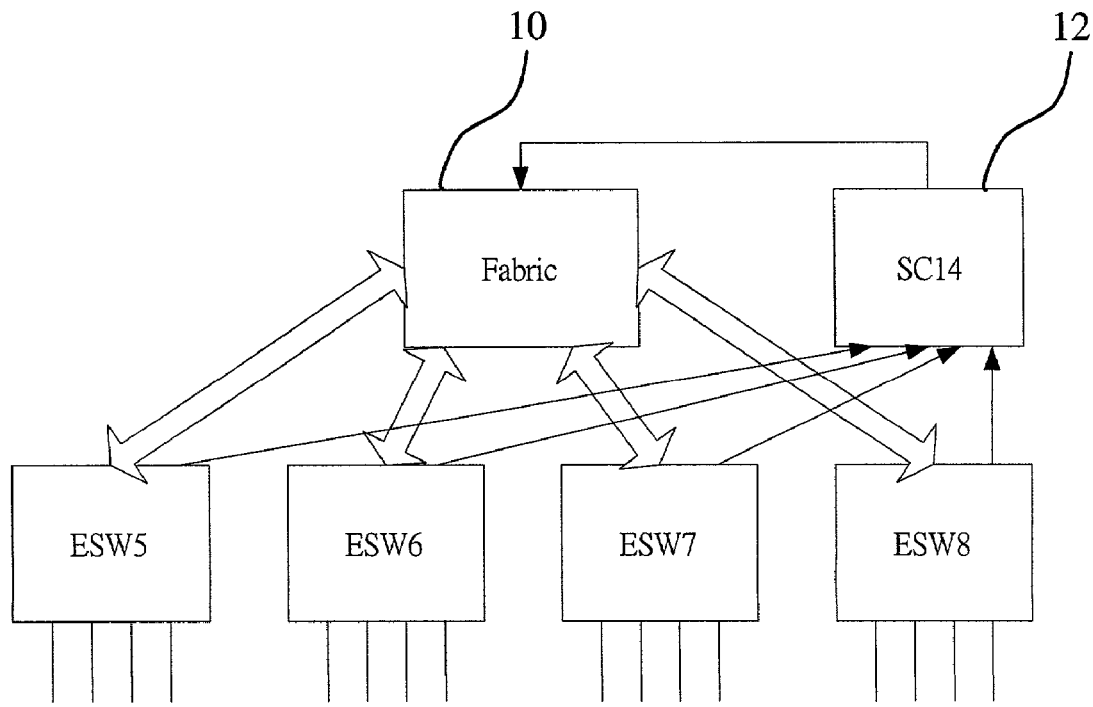
FIG. 2 is a functional block diagram of a network switch system with a known crossbar switching fabric structure.
Figure 3:
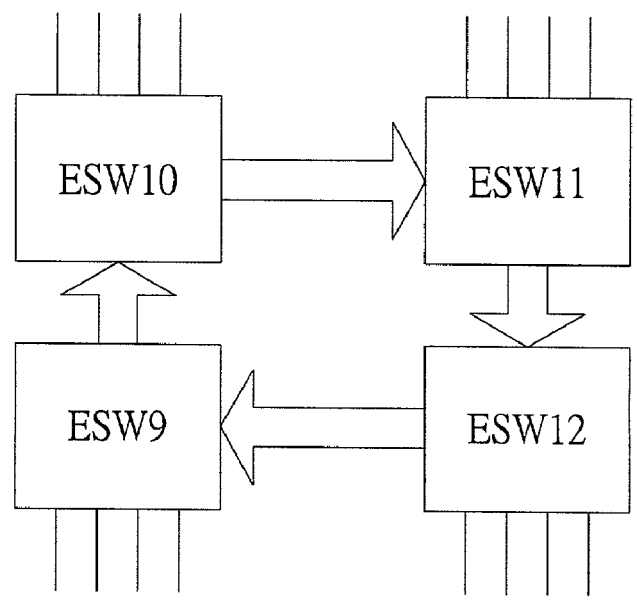
FIG. 3 is a functional block diagram of a network switch system with a known ring-bus structure.
Figure 4:
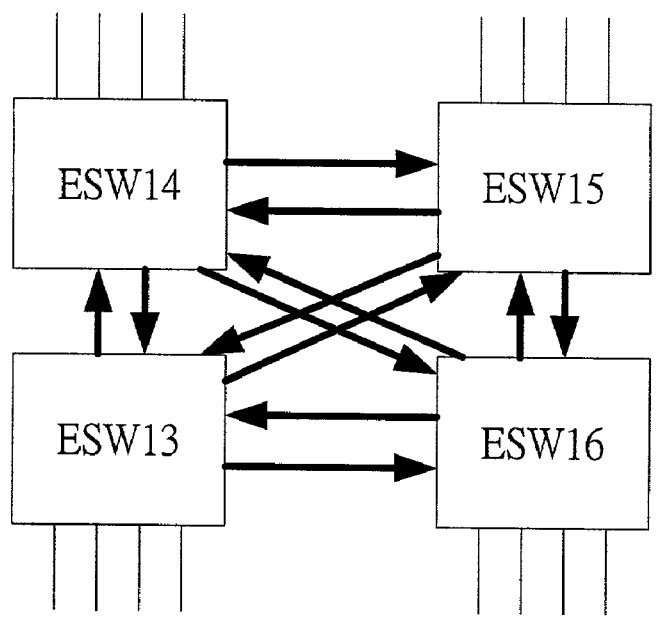
FIG. 4 is a functional block diagram of a network switch system with a known interleaved interconnection structure.
Figure 5:
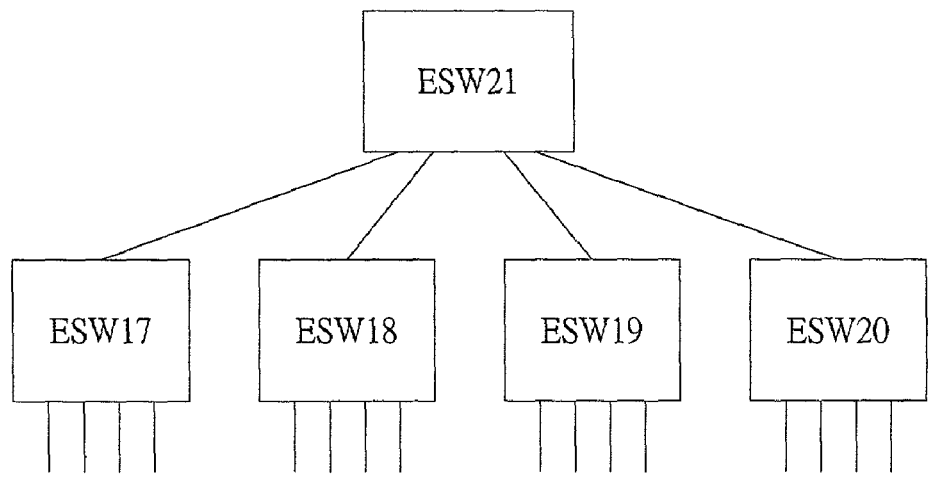
FIG. 5 is a functional block diagram of a network switch system with a known two-level structure.
Figure 6:
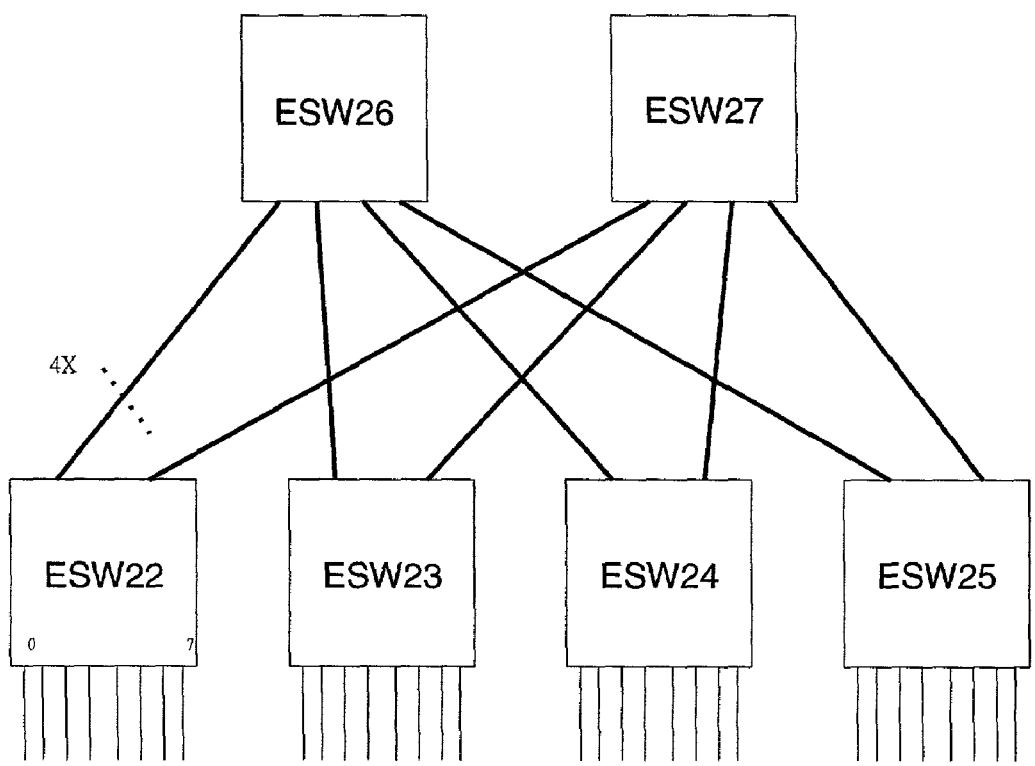
FIG. 6 is a functional block diagram of a known non-blocking switch system.
Figure 7:
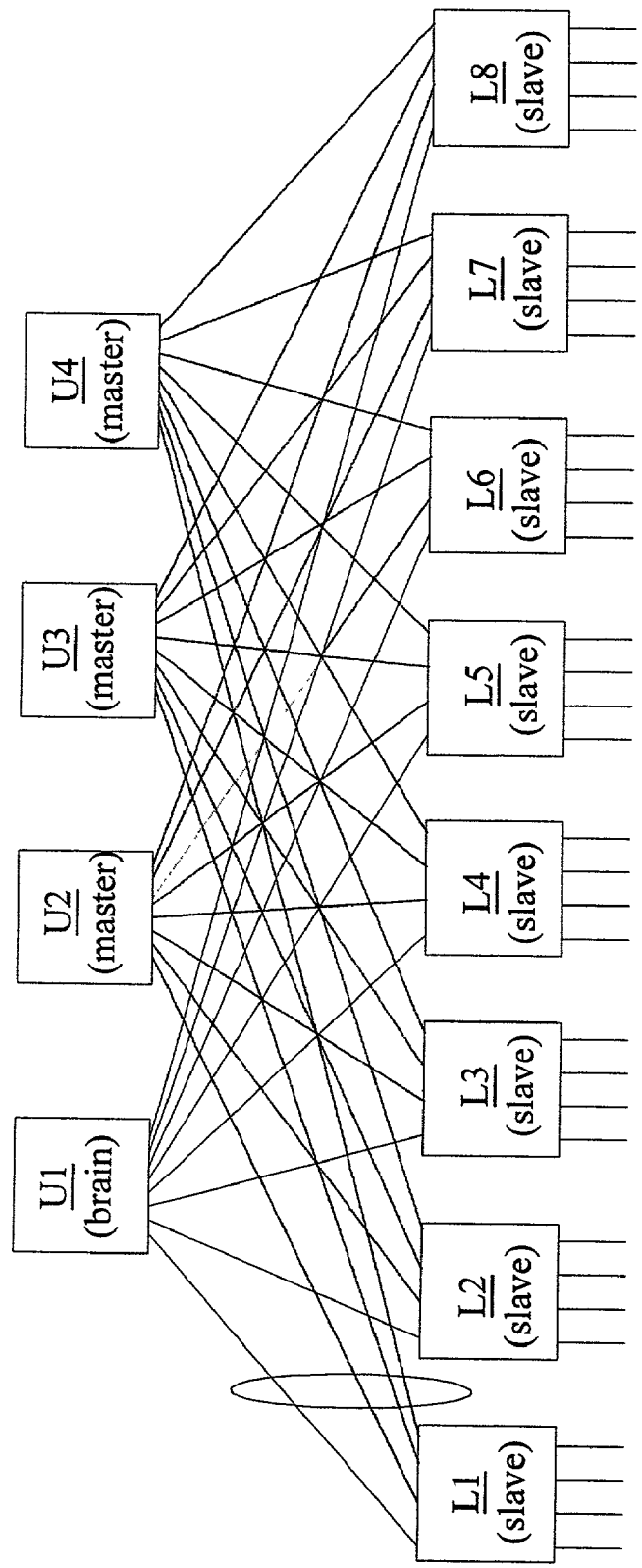
FIG. 7 is a functional block diagram consistent with one embodiment of the present invention.

FIG. 7 is a functional block diagram consistent with one embodiment of the present invention, specifically, an exemplary switch system that employs twelve eight-port switches to construct a thirty-two port switch system. Referring to FIG. 7, the switch system includes a plurality of lower-level network switches L1–L8, and a plurality of upper-level switches U1–U4. The system sets lower-level network switches L1–L8, into the slave mode. The lower-level network switches L1–LB provide input/output ports to external devices, or specifically, to the users of the ports provided by each of the lower-level network switches L1–L8. The system sets one of the upper-level switches, for example, U1, to the brain mode (hereinafter "brain switch U1") and other upper-level switches U2 to U4 to the master mode (hereinafter "master switches U2–U4"). The brain switch U1 and master switches U2–U4 operate in part to channel network packets between different lower-level network switches. Each of the upper-level switches may connect with any of the lower-level switches to form a non-blocking switch system. As a result of the direct connection, all the upper-level switches U1–U4 become "neighboring switches" of each of the lower-level switches, and all of the lower-level switches become "neighboring switches" of each of the upper-level switches.

Figure 8:
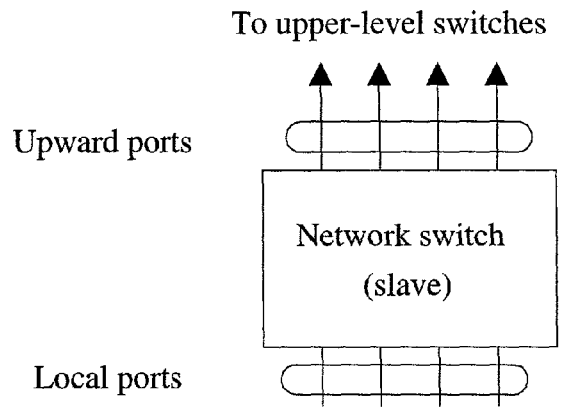
FIG. 8 is a block diagram of an exemplary lower-level port arrangement consistent with the present invention.

FIG. 8 is an exemplary port arrangement of any of the lower-level network switches shown in FIG. 7. Referring to FIG. 8, a lower-level network switch provides "upward ports" that connect with the upper-level network switches and "local ports" that provide input/output ports to the external devices or users of the lower-level network switch.

Taking an eight-port network switch as an example, the switch provides four upward ports and four local ports. The lower-level network switch sends refresh packets and network packets through the upward ports. In addition, the lower-level network switch treats the network packets as network trunk ports for ordinary network traffic.

The systems and methods of the present invention also provide refresh packets between the upper-level and lower-level switches to facilitate synchronization of forwarding databases in the system. A refresh packet is preferably a specifically identifiable packet containing source address information, such as the source address of a packet and the corresponding port information that needs to be registered by the system. When a switch in the system receives a refresh packet, the switch registers the source address information to the forwarding database of the switch. Preferably, the network switch system transmits the refresh packets within the system. Although the refresh packets might consume part of the system bandwidth, the systems and methods of the present invention provides a shorter Inter-Packet Gap ("IPG") or preamble to minimize bandwidth consumption.

Furthermore, a source-address learning delay may sometimes occur when the network system has not distributed refresh packets to all the switches. However, this delay only temporarily increases the broadcast traffic of the system and the broadcast traffic will diminish after the system has distributed the refresh packets to all of the switches. After synchronization, the forwarding databases of different switches have the same number of address entries. The contents of the address entries, however, may vary among the forwarding databases of different switches because the entries might contain different refresh timer values and port information for different neighboring switches.

Figure 9:
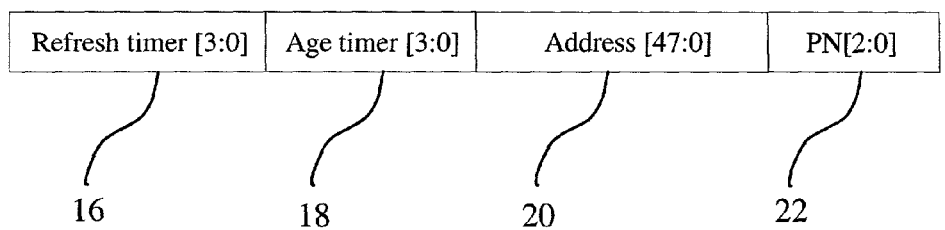
FIG. 9 is an exemplary address entry format in the forwarding database consistent with the present invention.

FIG. 9 is an exemplary address entry format in the forwarding database consistent with the present invention. Referring to FIG. 9, an entry of the forwarding database (not numbered) includes a refresh timer 16 that records the validity of a corresponding address entry in the forwarding databases of the neighboring switches within the system. As an example, the refresh timer 16 can be an up-counting timer or a down-counting timer that changes its value over time. When the counting value of the refresh timer 16 reaches a predetermined value, the switch recognizes that a corresponding address entry in the forwarding databases of the neighboring switches has "expired" and, therefore, needs to be updated. The switch resets the refresher timer 16 to its starting value either when the forwarding databases of the neighboring switches updates the corresponding entry or when the switch sends a refresh packet for that particular address entry.

Referring again to FIG. 9, the entry of the forwarding database also includes an age timer 18, address 20, and port information 22. The age timer 18 records the validity of the entry. As an example, the age timer 18 can be an up-counting timer or a down-counting timer that changes its value over time. When the counting value of the age timer 18 reaches a predetermined value, the switch recognizes that the entry in the forwarding database of the switch has "expired." The switch may then remove the expired entry from the forwarding database. The switch resets the age timer 18 to the starting value when the address entry is updated, usually through a source-address learning process, which may occur right after the switch receives an incoming packet or a refresh packet. The address 20 contains the address information of the entry, such as a Media Access Control ("MAC") address for an Ethernet network. The port information 22 includes associated port information for the address 20, such as a port number ("PN").

The network switch systems and method of the present invention also provide refresh packets to synchronize forwarding databases of the switches in the system. In general, the timing of sending a refresh packet is preferably packet-driven. Transmission of a refresh packet may occur upon receiving a network packet or an incoming refresh packet. In addition, a refresh packet may be sent by one of three ways.

A refresh packet may be sent when the switch receives a packet containing source address information but the forwarding database of the switch has no corresponding address entry. As an example, when the arrival of a packet triggers the source-address information learning ("SA learning") of a switch and the switch indicates that the forwarding database do not contain a corresponding entry for that source address, the switch sends a refresh packet containing the source address information of the incoming packet to register the information in the forwarding databases of neighboring switches in the system.

A refresh packet may also be sent when the switch receives a packet having expired source address information in a corresponding address entry in the neighboring switches. As an example, when the arrival of a packet triggers the SA learning of a switch and the switch indicates that the corresponding source address entry in the forwarding database of the neighboring switches has expired, the system sends a refresh packet containing the updated source address information of the incoming packet to register the updated information in the forwarding databases of the neighboring switches. The switch, for example, may identify such expiration based on the refresh timer 18 as illustrated in FIG. 9.

Finally, a refresh packet may be sent when the switch is in the brain mode and receives a refresh packet from neighboring switches.

Figure 10:
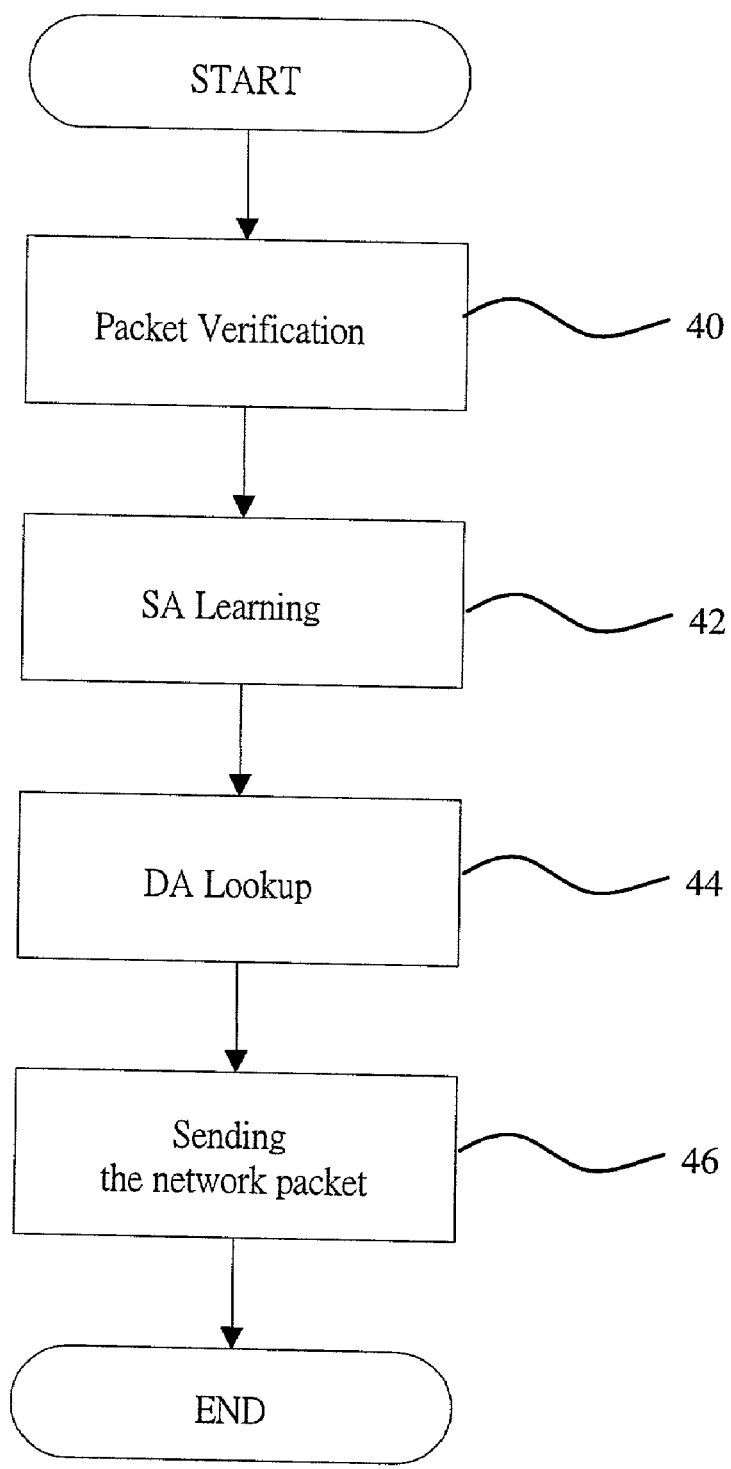
FIG. 10 is a flow chart showing the normal mode operation of a network switch consistent with the present invention.

As described previously, the systems and methods of the present invention operate in one of four modes. FIG. 10 is a flow chart showing the normal mode operation of a network switch consistent with the present invention. Referring to FIG. 10, the switch conducts packet verification, such as Cyclic Redundancy Check ("CRC"), at step 40 in order to filter out packets that have data or transmission errors. The verification step 40 ensures that all the packet information is correctly received. The switch proceeds with SA learning at step 42 to register the source address and source port information to the forwarding database of the switch.

The switch then performs destination address ("DA") information lookup at step 44 to obtain the destination port information based on the destination address of the incoming packet. If the switch cannot obtain the destination port information, the switch will broadcast the packet in order to have the packet delivered. The switch sends the packet to another network switch or another port within the same switch at step 46 by requesting and setting up a point-to-point connection with the destination port arranged. The switch may include two or more ports available as channels for transmitting the packet data. To achieve efficient transmission, the switch may choose one port from several available ports by checking a destination portmap that provides traffic or load information of the available ports.

Figure 11:
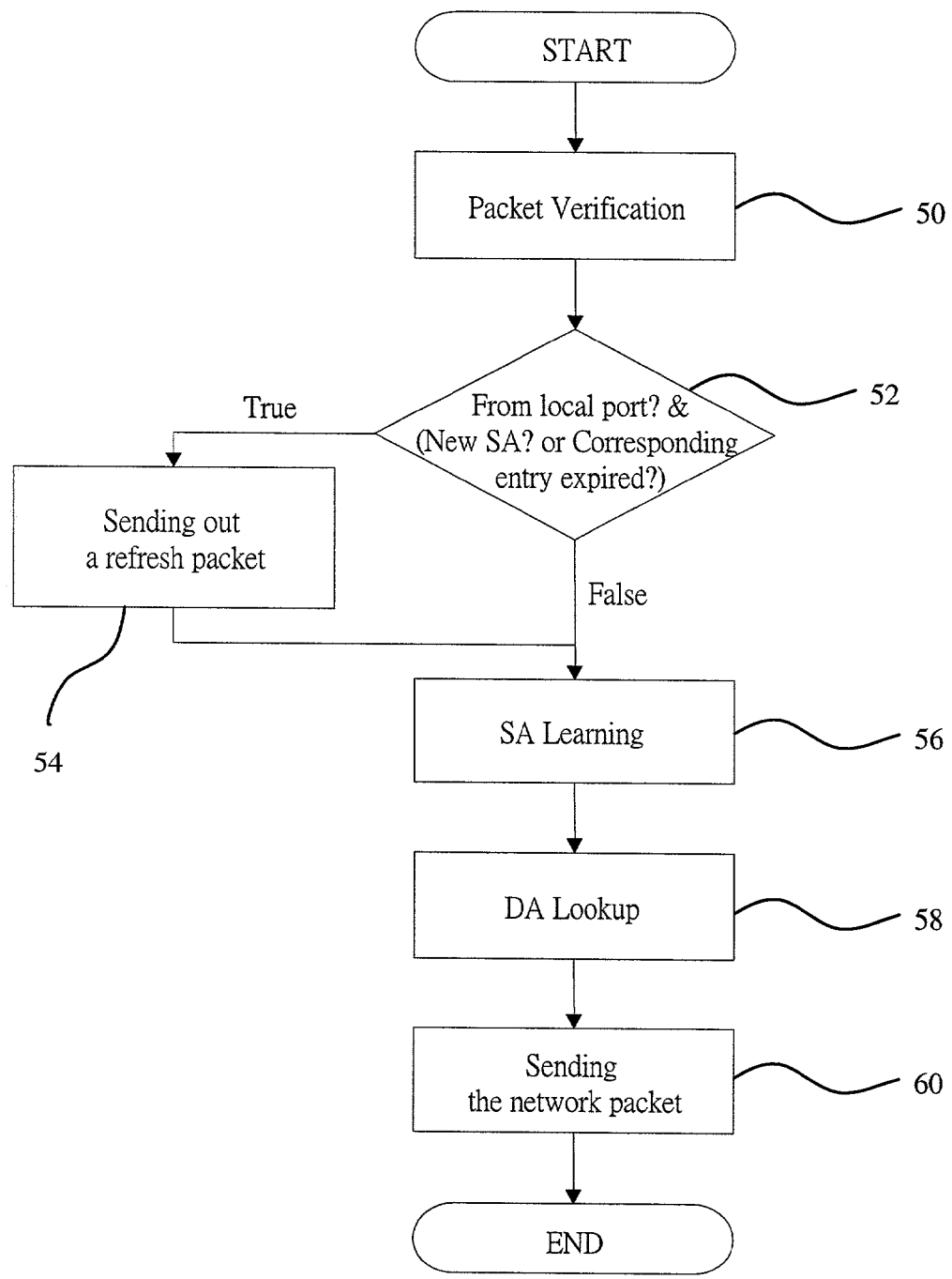
FIG. 11 is a flow chart showing the slave mode operation of a network switch consistent with the present invention.

FIG. 11 is a flow chart showing the slave mode operation of a network switch, such as the network switches L1 through L8 illustrated in FIG. 7, consistent with the present invention. Referring to FIG. 11, a slave switch conducts packet verification, such as Cyclic Redundancy Check ("CRC"), at step 50 in order to filter out packets that have data or transmission errors. The verification step 50 also ensures that all the packet information of an incoming network packet is correctly received. If the arrival packet is a refresh packet, the slave switch also ensures that the network switch receives the refresh packet correctly and marks the refresh packet at step 50. In addition, refresh packets from upward ports will be received correctly, and refresh packets from local ports will be discarded. The slave switch then determines at step 52 (1) whether the packet is from local ports, (2) whether the forwarding database of the switch contains any corresponding entry to the source address information of the incoming packet, and (3) whether a corresponding address entry of the source address in the forwarding database of neighboring switches has expired. If the slave switch determines that the packet is from the local ports and the forwarding database of the slave switch contains no corresponding entry to the source address information of the packet, or the corresponding address entry in the neighboring switches has expired, the slave switch sends a refresh packet through the upward ports of the switch to upper-level switches at step 54. Referring to FIG. 7, a slave switch, for example, L1, may send a refresh packet to all the upper-level switches U1–U4.

To avoid providing the source address information more than once to an upper-level switch, the slave switch cannot provide the refresh packet to an intermediate channeling switch, if one exists. A channeling switch, preferably an upper-level switch, provides the channel with communicating packet data between two lower-level switches. Because the network packet that goes through the channeling switch contains the same source address information as the refresh packet, the channeling switch does not need a refresh packet to synchronize the forwarding database. As an example, referring to FIG. 7, when the slave switch L1 sends the network packet to an intermediate channeling switch, for example, U2, and needs to send the refresh packet containing the corresponding address information of the network packet, the slave switch L1 only sends the refresh packet to the other three switches U1, U3, and U4, and skip sending the refresh packet to the channeling switch U2. When the slave switch does send the refresh packet, the switch may also reset the refresh timer of the corresponding entry within the forwarding database of the switch to reflect that the corresponding address entry in the neighboring switches has been updated.

Referring again to FIG. 11, if the slave switch determines that the packet is not from the local ports and is a refresh packet or the slave switch has completed step 54, the slave switch proceeds with source address information learning at step 56. The slave switch registers the source address information of an incoming refresh packet or an incoming network packet to the forwarding database of the salve switch. The slave switch also resets the age timer to reflect that the switch has updated the corresponding address entry.

For an incoming network packet, the slave switch performs destination address information lookup ("DA lookup") at step 58 to obtain the destination port information corresponding to the destination address of the packet. At step 60, the slave switch sends the packet to another network switch or port within the same switch by requesting and setting up a point-to-point connection with the destination port arranged. The slave switch may have two or more ports available as channels for transmitting packet data. To achieve efficient transmission, the switch may choose one port from several available ports by checking a destination portmap that provides the traffic or load information of the available ports.

Figure 12:
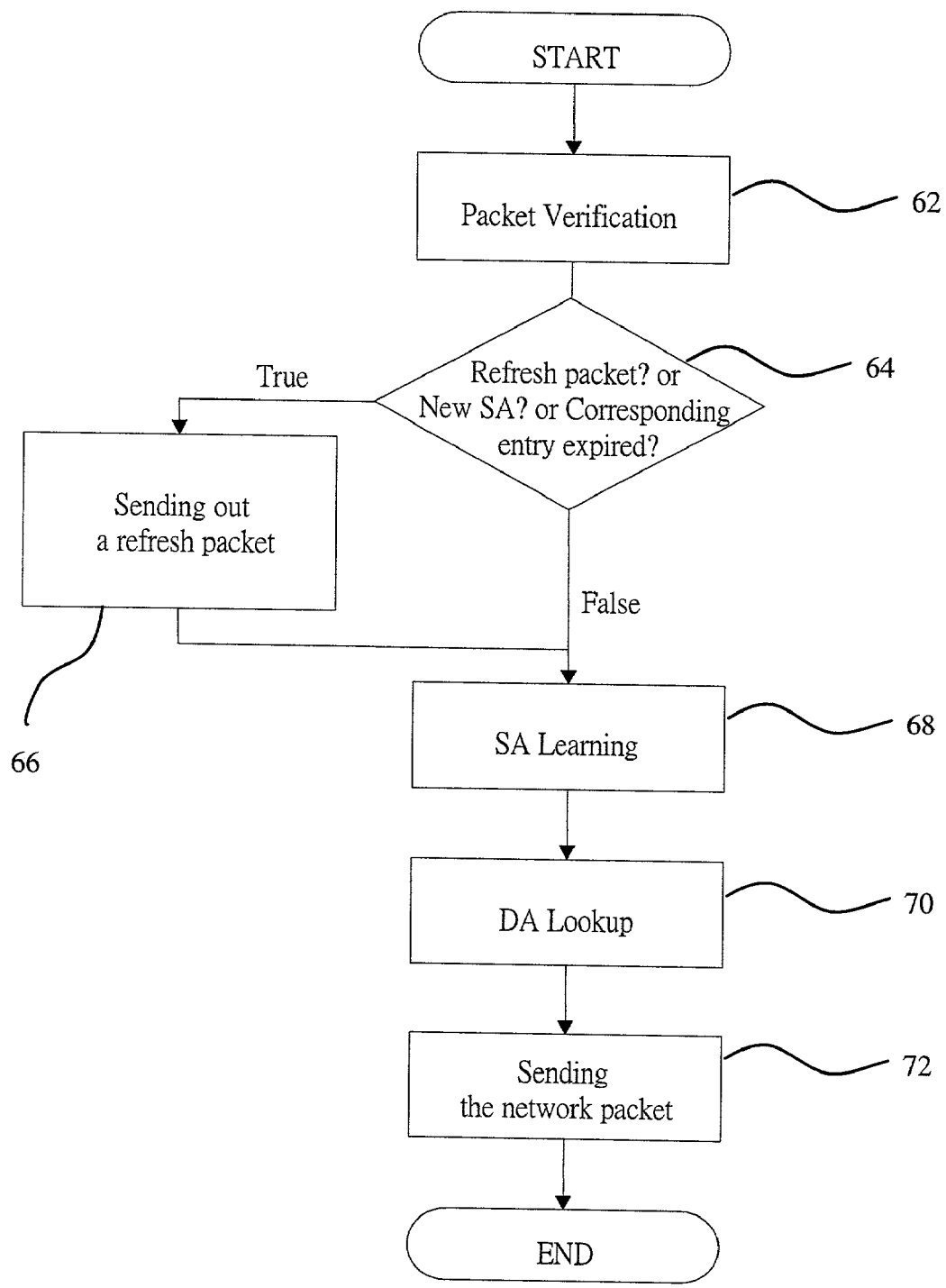
FIG. 12 is a flow chart showing the brain mode operation of a network switch consistent with the present invention.

FIG. 12 is a flow chart showing the brain mode operation of a network switch, such as the network switches U1 illustrated in FIG. 7, consistent with the present invention. Referring to FIG. 12, the brain switch U1 conducts packet verification, such as Cyclic Redundancy Check ("CRC"), at step 62 in order to filter out packets that have data or transmission errors. The verification step 62 also ensures that all the packet information of an incoming network packet is correctly received. If the arrival packet is a refresh packet, the brain switch also ensures that the network switch receives the refresh packet correctly and marks the refresh packet at step 62.

The brain switch determines the following conditions at step 64 (1) whether the packet is a refresh packet, (2) whether the forwarding database of the brain switch contains any address entry corresponding to the source address information of the incoming network packet, and (3) whether the corresponding address entry of the source information in the forwarding databases of neighboring switches has expired. If the packet is a refresh packet, the brain switch sends the refresh packet to the neighboring switches. The brain switch may skip sending the refresh packet to an initiating switch. For example, referring to FIG. 7, if the brain switch U1 receives a refresh packet from an initiating lower-level switch, for example, the switch L2, the brain switch U1 may skip sending the same refresh packet to the switch L2 because the switch L2 has already updated the same address information. When the brain switch U1 sends the refresh packet, the brain switch may also reset the refresh timer of the corresponding entry within the forwarding database to reflect that the corresponding address entry in the neighboring switches has been updated.

Referring again to FIG. 12, if the packet is not a refresh packet, but the forwarding database of the brain switch contains no source address information of the network packet or the corresponding address entry in the neighboring switches has expired, the brain switch sends the refresh packet to neighboring switches within the system. The brain switch may skip sending the refresh packet to a source switch that sends the network packet to the brain switch. For example, referring to FIG. 7, if the brain switch U1 receives a network packet from a source switch, for example, switch L3, the brain switch may skip sending the refresh packet to the source switch L3 because the source switch L3 has already updated the corresponding address information. Similarly, when the brain switch sends the refresh packet, the brain switch may also reset the refresh timer of the corresponding entry within the forwarding database to reflect that the corresponding address entry in the neighboring switches has been updated.

Referring to FIG. 12, if none of the conditions of step 64 is met or the brain switch has completed step 66, the brain switch proceeds with source address information learning at step 68. The brain switch registers the source address information of an incoming refresh packet or an incoming network packet to the forwarding database of the switch. The brain switch also resets the age timer to reflect that the switch has updated the corresponding address entry.

For an incoming network packet, the brain switch performs destination address information lookup ("DA lookup") at step 70 to obtain the destination port information corresponding to the destination address of the packet. At step 72, the brain switch sends the network packet to another network switch by requesting and setting up a point-to-point connection with the destination port arranged. The brain switch might have two or more ports available as channels for transmitting packet data. To achieve efficient transmission, the brain switch may choose one port from several available ports by checking a destination portmap that provides the traffic or load information of the available ports.

Figure 13:
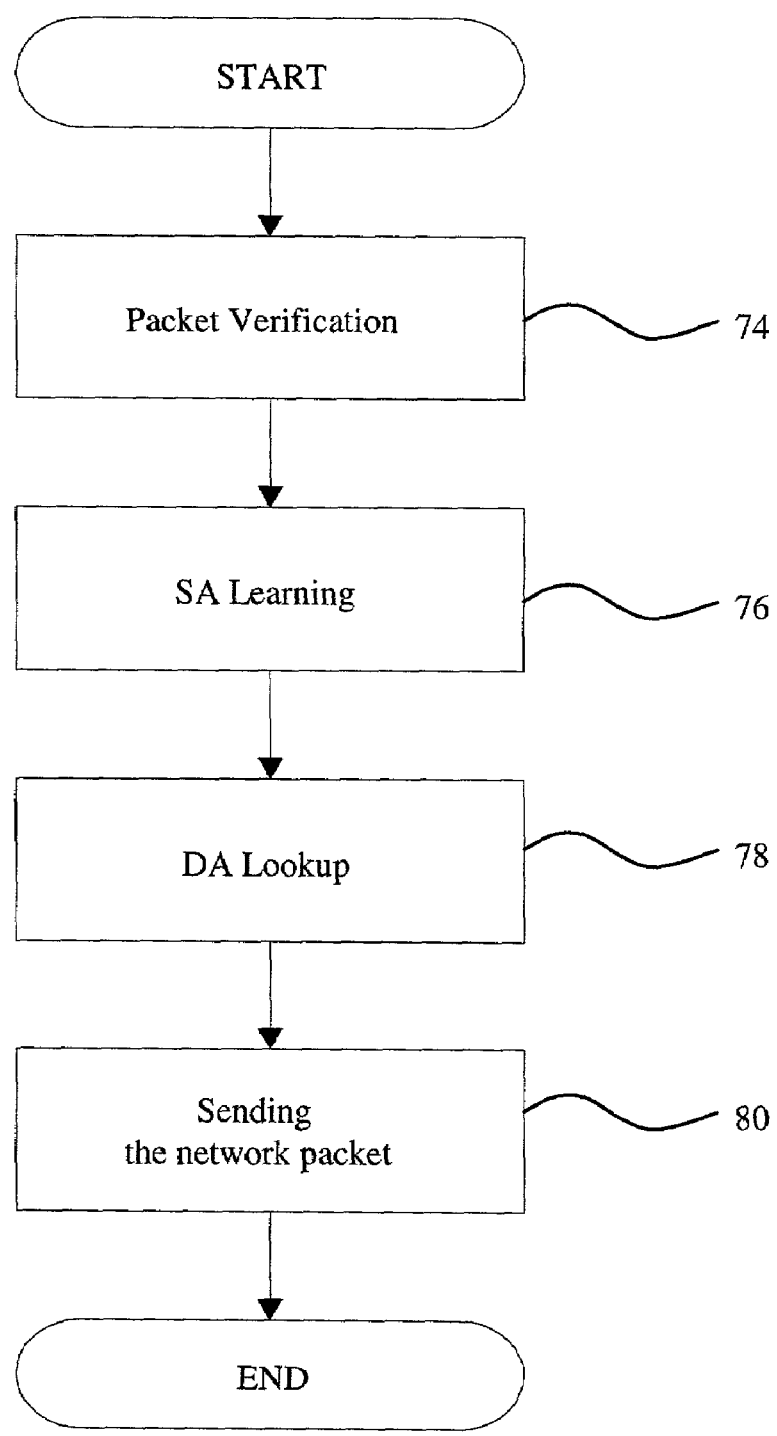
FIG. 13 is a flow chart showing the master mode operation of a network switch consistent with the present invention.

FIG. 13 is a flow chart showing the master mode operation of a network switch, such as the network switches U2, U3 or U4, illustrated in FIG. 7, consistent with the present invention. The master switch conducts packet verification, such as Cyclic Redundancy Check ("CRC"), at step 74 to filter out packets that have data or transmission errors. The verification step 74 ensures that all the packet data of an incoming network packet is correctly received. If the arrival packet is a refresh packet, the master switch also ensures that the network switch receives the refresh packet correctly and marks the refresh packet. The master switch proceeds with source address information learning at step 76. The master switch registers the source address information of an incoming refresh packet or an incoming network packet to the forwarding database of the master switch.

For an incoming network packet, the master switch performs destination address information lookup ("DA lookup") at step 78 to obtain the destination port information corresponding to the destination address of the packet. At step 80, the master switch sends the packet to another network switch or another port within the same switch by requesting and setting up a point-to-point connection with the destination port. The master switch might have two or more ports available as channels for transmitting packet data. To achieve efficient transmission, the master switch may choose one port from several available ports by checking a destination portmap that provides the traffic or load information of the available ports.

As the above paragraphs illustrate, the present invention provides systems and methods for stacking network switches. The systems and methods provide combination of network switches and their operations in different modes. The systems and methods enable the same type of switches to be combined without requiring additional devices, such as external CPUs, switching fabrics, special bus or wiring arrangements, or new interfaces. The systems and methods of the present invention improve the operational efficiency of network switching system, provide improved bandwidth of switch systems, and offer a cost-effective approach to constructing or operating network systems with expanded number of ports.

It will be apparent to those skilled in the art that various modifications and variations can be made in the disclosed systems and methods without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A network switch system, comprising:
   a plurality of network switches for providing an exchange of network packets, each of the network switches comprising;
   a forwarding database; and
   a component providing at least one refresh packet, provided upon receiving the network packets, to synchronize the forwarding databases of the plurality of network switches;
   wherein each of the plurality of network switches registers the at least one refresh packet to the forwarding database of the network switch upon receiving the refresh packets, and wherein the plurality of network switches include a first switch and a second switch, each having a forwarding database, the first switch sending a refresh packet to the second switch when a) the first switch receives a network packet containing address information indicating that the forwarding database of the first switch has no corresponding address entry, or b) the first switch receives a network packet containing address information indicating that a corresponding address entry in the forwarding database of the second network switch has expired.

2. The system as claimed in claim 1, wherein the forwarding databases include at least one refresh timer in an address entry for recording the validity of a corresponding address entry in the forwarding databases of neighboring switches.

3. The system as claimed in claim 1, wherein the forwarding databases include an address entry having an age timer for the address entry that records the validity of the address entry, an address for the address entry, and associated port information for the address.

4. The system as claimed in claim 1, wherein the plurality of network switches further comprises, a plurality of first-level switches having a plurality of upward ports operating in a slave mode, a plurality of second-level switches including a channeling switch, wherein each of the first-level switches is configured to connect to each of the second-level switches, wherein at least one second-level switch operates in a brain mode and at least one second-level switch operates in a master mode, wherein the first-level switches providing a plurality of local ports for receiving and sending network packets, the upward ports of the first-level switches connecting to the second-level switches, the first-level switches sending the refresh packets to the second-level switches for synchronizing the forwarding databases of the second-level switches, and wherein the second-level switches providing packet communications among the first-level switches, the second-level switch operating in the brain mode providing refresh packets to the first-level switches for synchronizing the forwarding databases of the first-level switches.

5. The system as claimed in claim 4, wherein when one of the first-level switches sends a network packet to one of the second first-level switches through the channeling switch and needs to send a refresh packet containing the source address information of the network packet, the first-level switch sends the refresh packet to each of the second-level switches except the channeling switch.

6. The system as claimed in claim 4, wherein when a second-level switch needs to send a refresh packet from an initiating first-level switch, the second-level switch sends the refresh packet to each of the first-level switches except the initiating first-level switch.

7. The system as claimed in claim 4, wherein when the a second-level switch needs to send a refresh packet containing the source address information of a network packet from a first-level source switch, the second-level switch sends the refresh packet to each of the first-level switches except the first-level source switch.

8. The system as claimed in claim 4, wherein each of the first-level switches employs the upward ports as trunk ports for sending the network packets.

9. The system as claimed in claim 1, wherein the network switches are Ethernet switches.

10. A network switch system, comprising:

a plurality of first-level switches operating in a slave mode, the first-level switches providing a plurality of local ports for receiving and sending network packets; and a plurality of second-level switches operating in one of brain mode or master mode, wherein the first-level switches include a plurality of upward ports connecting to the second-level switches, each of the first-level switches and the second-level switches having a forwarding database, wherein the first-level switches send the refresh packets to the second-level switches, for synchronizing the forwarding databases of the second-level switches, when a) the first-level switch receives a network packet containing address information indicating that the forwarding database of the first-level switch has no corresponding address entry, or b) the first-level switch receives a network racket containing address information indicating that a corresponding address entry in the forwarding databases of one of the second-level switches has expired, wherein the second-level switches provide packet communications among the first-level switches, and wherein a second-level switch operating in the brain mode provides refresh packets to the first-level switches for synchronizing the forwarding databases of the first-level switches.

11. The system as claimed in claim 10, wherein each of the first-level and second-level switches registers the refresh packets information to the forwarding databases upon receiving the refresh packets.

12. The system as claimed in claim 10, wherein the forwarding databases of the first-level switches include at least one refresh timer in an address entry for recording the validity of a corresponding address entry in the forwarding databases of the second-level switches.

13. The system as claimed in claim 10, wherein the forwarding database of the second-level switch operating in the brain mode includes a refresh timer in an address entry for recording the validity of a corresponding address entry in the forwarding databases of the first-level switches.

14. The system as claimed in claim 10, wherein the forwarding databases of the first-level and second-level switches include an address entry containing an age timer for the address entry to record the validity of the address entry, an address for the address entry, and associated port information for the address.

15. The system as claimed in claim 10, wherein the second-level switch operating in the brain mode sends a refresh packet to the first-level switches connected with the second-level switch if the second-level switch operating in the brain mode receives a network packet, and the network packet contains address information that the forwarding database of the second-level switch operating in the brain mode has no corresponding address entry, the network packet containing address information that corresponding address entries in the forwarding databases of the first-level switches have expired, or the second-level switch operating in the brain mode receives an incoming refresh packet from the first-level switches.

16. The system as claimed in claim 10, wherein when one of the first-level switches sends a network packet to one of the second first-level switches through a channeling second-level switch and needs to send a refresh packet containing the source address information of the network packet, the first-level switch sends the refresh packet to each of the second-level switches except the channeling second-level switch.

17. The system as claimed in claim 10, wherein when one of the second-level switches needs to send a refresh packet coming from a first-level initiating switch or containing the source address information of a network packet from a first-level source switch, the second-level switch sends the refresh packet to each of the first-level switches except the first-level initiating switch and the first-level source switch.

18. A method for operating a network switch in a slave mode within a network switch system, the slave switch having a forwarding database, comprising:
   receiving a network packet;
   sending an outgoing refresh packet to neighboring switches when
     a) the network packet contains address information indicating that the slave switch has no corresponding record in the forwarding database of the slave switch, or
     b) the network packet contains address information indicating that corresponding address entries in the forwarding databases of the neighboring switches have expired, wherein the slave switch sends the outgoing refresh packet to synchronize the forwarding databases of the neighboring switches;
   registering the address information of the network packet to the forwarding database of the slave switch; and
   registering the address information of an incoming refresh packet to the forwarding database of the slave switch upon receiving the incoming refresh packet.

19. The method as claimed in claim 18, further comprising:
   looking up the destination port of the network packet in the forwarding database of the slave switch;
   sending the network packet to the destination port; and
   broadcasting the network packet when the forwarding database of the slave switch has no corresponding destination port information for the network packet.

20. The method as claimed in claim 18, wherein the forwarding database of the slave switch includes a refresh timer in an address entry for recording the validity of a corresponding address entry in the forwarding databases of the neighboring switches.

21. The method as claimed in claim 18, wherein the forwarding database of the slave switch includes an address entry containing an age timer for the address entry that records the validity of the address entry, an address for the address entry, and associated port information for the address.

22. The method as claimed in claim 18, wherein the slave switch provides local ports for receiving and sending network packets and upward ports connecting to the neighboring switches.

23. The method as claimed in claim 18, wherein when the slave switch sends the network packet to a channeling switch and needs to send the outgoing refresh packet containing the source address information of the network packet, the slave switch sends the outgoing refresh packet to all the neighboring switches except the channeling switch.

24. The method as claimed in claim 18, wherein the neighboring switches includes network switches operating in a brain mode or a master mode.

25. A method of operating a network switch in a brain mode within a network switch system, the network switch having a forwarding database, comprising:
   receiving a network packet;
   sending an outgoing refresh packet to neighboring switches when
     a) the network packet contains address information indicating that the forwarding database of the brain switch has no corresponding address entry or
     b) the network packet contains address information indicating that corresponding address entries in the forwarding databases of the neighboring switches have expired; and
   registering the address information of the network packet to the forwarding database of the brain switch,
     wherein the brain switch receives an incoming refresh packet from the neighboring switches, and sends the outgoing refresh packet to synchronize the forwarding databases of the neighboring switches.

26. The method as claimed in claim 25, further comprising:
   looking up the destination port of the network packet in the forwarding database of the brain switch;
   sending the network packet to the destination port; and
   broadcasting the network packet if the forwarding database of the brain switch has no corresponding destination port information for the network packet.

27. The method as claimed in claim 25, wherein the forwarding database of the brain switch includes a refresh timer in an address entry that records the validity of corresponding address entries of the forwarding databases of the neighboring switches.

28. A method of operating a network switch in a master mode within a network switch system, the master switch having a forwarding database, comprising:
   receiving an incoming network packet;
   registering address information of an incoming refresh packet to the forwarding database of the master switch upon receiving the incoming refresh packet;
   looking up the destination port of the incoming network packet in the forwarding database of the master switch;
   sending the incoming network packet to the destination port; and
   broadcasting the incoming network packet when the forwarding database does not have corresponding destination port information,
   wherein
     a neighboring switch of the master switch sends the refresh packet to the master switch when
       a) the neighboring switch receives an original network packet, and the original network packet contains address information indicating that the forwarding database of the neighboring switch has no corresponding address entry, or
       b) the neighboring switch receives an original network packet, and the original network packet contains address information indicating that a corresponding address entry in the forwarding databases of the master switch has expired.

29. The method as claimed in claim 28, wherein the incoming refresh packet contains address and corresponding port information.

30. The method as claimed in claim 28, wherein the forwarding database of the master switch includes an address entry containing an age timer for the address entry that records the validity of the address entry, an address for the address entry, and associated port information for the address.

31. The method as claimed in claim 28, wherein the master switch connects to neighboring switches within the network switch system and the neighboring switches operate in a slave mode.

32. A method for stacking network switches, comprising:
providing a plurality of network switches, including first and second switches, for providing an exchange of network packets;
providing a forwarding database for each of the network switches;
providing at least one refresh packet to synchronize the forwarding databases of the plurality of network switches upon receiving the network packets;
registering the refresh packet for each of the plurality of network switches to the forwarding databases
wherein the first switch sends a refresh packet to a second switch when
a) the first switch receives a network packet and the network packet contains address information indicating that the forwarding database of the first switch has no corresponding address entry, or
b) the first switch receives a network packet and the network packet contains address information that a corresponding address entry in the forwarding database of the second switch has expired.

33. The method as claimed in claim 32, further comprising,
providing a plurality of first-level switches having a plurality of upward ports operating in a slave mode,
providing a plurality of second-level switches including a channeling switch,
operating at least one second-level switch operates in a brain mode,
operating at least one second-level switch operates in a master mode,
providing a plurality of local ports in the first-level switches for receiving and sending network packets,
connecting the upward ports of the first-level switches to the second-level switches,
sending the refresh packets to the second-level switches for synchronizing the forwarding databases of the second-level switches, and
providing packet communications among the first-level switches, and providing refresh packets to the first-level switches for synchronizing the forwarding databases of the first-level switches.

34. The method as claimed in claim 33, further comprising sending the refresh packet to each of the second-level switches except the channeling switch when one of the first-level switches sends a network packet to one of the second first-level switches through the channeling switch and needs to send a refresh packet containing the source address information of the network packet.

35. The system as claimed in claim 33, further comprising sending the refresh packet to each of the first-level switches except the initiating first-level switch when one of the second-level switch needs to send a refresh packet from an initiating first-level switch.

36. The system as claimed in claim 33, further comprising sending the refresh packet to each of the first-level switches except the first-level source switch when one of the second-level switch needs to send a refresh packet containing the source address information of a network packet from a first-level source switch.

* * * * *

UNITED STATES PATENT AND TRADEMARK OFFICE
CERTIFICATE OF CORRECTION

PATENT NO.       : 7,139,267 B2
APPLICATION NO.  : 10/087761
DATED            : November 21, 2006
INVENTOR(S)      : Kuo-Cheng Lu et al.

It is certified that error appears in the above-identified patent and that said Letters Patent is hereby corrected as shown below:

Title page, item (57), line 6, "includes" should read --include--.

Title page, item (57), line 10, "sends" should read --send--.

Claim 1, column 14, line 58, "comprising;" should read --comprising:--.

*Claim 7, column 15, line 62, "when the a" should read --when a--.

*Claim 10, column 16, line 24, "racket" should read --packet--.

Claim 24, column 18, line 2, "includes" should read --include--.

Claim 35, column 20, line 26, "switch" should read --switches--.

Claim 36, column 20, line 31, "switch" should read --switches--.

Signed and Sealed this

Twenty-seventh Day of March, 2007

JON W. DUDAS
*Director of the United States Patent and Trademark Office*